(No Model.)

J. H. MASON.
DIRECT ACTING OSCILLATING ELECTRIC MOTOR.

No. 598,946. Patented Feb. 15, 1898.

Witnesses:-
George Barry Jr.
Fred Haynes

Inventor.-
James H. Mason
by attorneys

UNITED STATES PATENT OFFICE.

JAMES H. MASON, OF BROOKLYN, NEW YORK, ASSIGNOR TO JOHN W. MORRISON AND W. W. LOUNSBURY, OF SAME PLACE.

DIRECT-ACTING OSCILLATING ELECTRIC MOTOR.

SPECIFICATION forming part of Letters Patent No. 598,946, dated February 15, 1898.

Application filed March 24, 1897. Serial No. 629,027. (No model.)

*To all whom it may concern:*

Be it known that I, JAMES H. MASON, of Brooklyn, in the county of Kings and State of New York, have invented a new and useful Improvement in Direct-Acting Oscillating Electric Motors, of which the following is a specification.

My invention relates to an improvement in electric motors, the object being to provide a direct-acting oscillating electric motor which shall be automatic in its action and which is capable of being connected directly to any desired mechanism which it may be required to drive.

A further object is to provide a motor of the above character which will be very simple in construction, which may be made at a small cost, and in which the oscillating movement of the armature changes the direction of the electric current for alternately swinging the said armature a limited distance in both directions.

A practical embodiment of my invention is represented in the accompanying drawings, in which—

Figure 2:
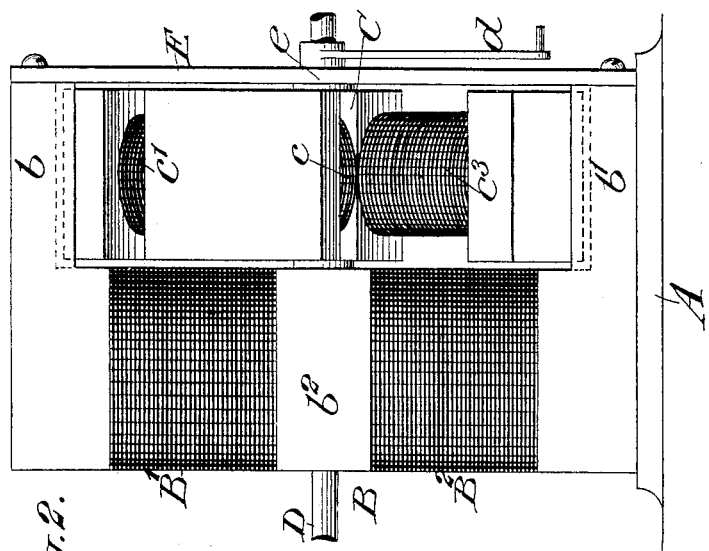
Figure 1:
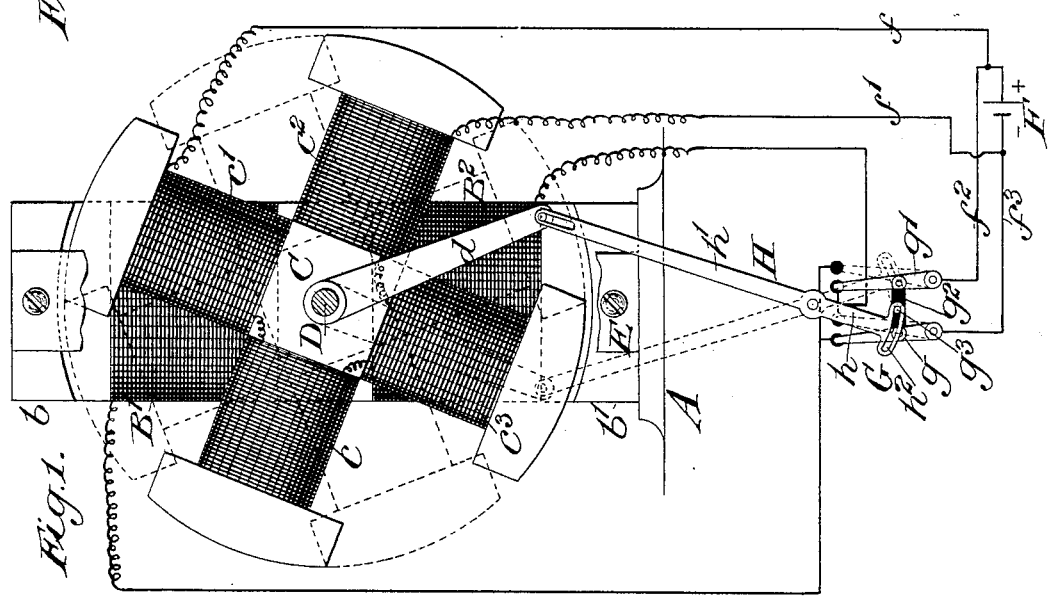

Figure 1 represents a face view of the motor and a device for operating the pole-changer to change the direction of the current through the field-magnet, and Fig. 2 is a side view of the motor.

The field-magnet is supported upon a suitable base A of any suitable size and form. The said field-magnet consists of an upright portion B, provided with forwardly-extended arms $b\ b'$, which arms are located at the top and bottom of the said upright B. The upright portion B of the field-magnet is provided with suitable coils $B'\ B^2$ intermediate of its ends.

The oscillating armature consists of a suitable central hub C, having four arms $c\ c'\ c^2\ c^3$ radiating therefrom and provided with the usual armature-coils. The said armature is mounted so that its ends will oscillate between the extremities of the arms $b\ b'$ of the field-magnet in a plane transverse to the plane passing through the longitudinal axes of the said arms.

The shaft D, by means of which power is transmitted from the motor for practical use, is mounted in a suitable bearing $b^2$, midway of the length of the upright portion B of the field-magnet, and also in a suitable bearing $e$ in a bar E, connecting the free ends of the arms $b\ b'$. The shaft D has the oscillating armature locked securely thereto in any suitable manner.

A suitable battery F is represented for supplying an electric current through the coils of the oscillating armature. The coils upon the armature are preferably wound in one direction and a continuous current is permitted to pass therethrough at all times, the wires which connect the battery F with the said coils being denoted by $f\ f'$.

The wires which lead from the battery F to the coils on the field-magnet are denoted by $f^2\ f^3$, and they lead through a suitable pole-changer G, which pole-changer is under the control of the oscillating armature, whereby the movement of the said armature changes the direction of the coils in the said field-magnet for causing its arms $b\ b'$ to alternately attract and repel the ends of the arms $c\ c'\ c^2\ c^3$ of the oscillating armature.

The pole-changer G may be of any desired form, it being represented in the accompanying drawings diametrically by means of a pair of arms $g\ g'$, connected by an insulated piece $g^2$, which insulated piece is provided with a pin $g^3$, which has a connection with the short arm $h$ of a lever H, the long arm $h'$ of the said lever having a connection with a rocking arm $d$, secured to rock with the shaft D. The short arm $h$ of the said rocking lever H is provided with a suitable elongated slot $h^2$, which will permit of the oscillating armature nearly completing its movement in one direction before it will throw the pole-changer over to change the direction of the current in the field-magnet.

In the accompanying drawings I have shown the arms $c'\ c^2$ as of constant positive polarity and the arms $c\ c^3$ as of constant negative polarity. It will be seen that as the current is changed in the field-magnet the arms $b\ b'$ will be caused to alternately have a negative and positive polarity. When the arm $b$ is caused to have a positive polarity and the arm $b'$ is caused to have a negative polarity, the armature being in the position represented in the accompanying drawings, the arm $b$ will repel the arm $c'$ and attract the arm $c$. At the same time the arm $b'$ will repel the arm $c^3$ and attract the arm $c^2$. The armature will thus be locked until it has operated the pole-changer to shift the current, when the polarity of the arms $b\ b'$ will be reversed and they will tend to return the armature back to the position represented in the accompanying drawings.

The shaft D may be provided with any suitable arrangement for imparting the oscillating movement of the armature to any desired mechanism which it is desired to drive.

It is to be understood that instead of the armature changing the direction of the current in the field-magnet it might be used to change the direction of the current in the armature, the current through the field-magnet remaining constant, if so desired.

What I claim is—

A direct-acting oscillating electric motor comprising field-magnets having forwardly-extended arms projecting at right angles to the axes of their coils, means for energizing the said field-magnets, an armature comprising a plurality of radially-extending arms mounted to rock back and forth between the projecting arms of the field-magnets, said arms being provided with coils, means for maintaining a constant current through the coils of the armature and means for changing the polarity of the field-magnets, substantially as set forth.

JAMES H. MASON.

Witnesses:
FREDK. HAYNES,
C. S. SUNDGREN.